United States Patent [19]

Kern

[11] 4,195,435
[45] Apr. 1, 1980

[54] FLOAT POSITION ADJUSTMENT APPARATUS FOR FISHING LINE

[76] Inventor: Fred G. Kern, 534 Bluff, Hutchinson, Minn. 55350

[21] Appl. No.: 921,744

[22] Filed: Jul. 3, 1978

[51] Int. Cl.$^2$ ............................................. A01K 91/06
[52] U.S. Cl. ................................. 43/44.87; 43/449; 289/1.2
[58] Field of Search ............... 43/42.05, 44.87, 44.9, 43/44.91, 43.1; 289/17, 1.2

[56] References Cited

U.S. PATENT DOCUMENTS

| | | | |
|---|---|---|---|
| 2,106,618 | 1/1938 | Mehaffey | 43/44.9 |
| 2,593,728 | 4/1952 | Carpenter | 43/44.91 |
| 3,011,285 | 12/1961 | Musser | 43/44.87 |
| 3,114,984 | 12/1963 | Atton | 43/44.9 |
| 3,196,575 | 7/1965 | Kotis | 43/44.87 |
| 3,686,787 | 8/1972 | Milouich | 43/44.9 |
| 3,738,692 | 6/1973 | Martuch | 289/1.2 |
| 3,857,645 | 12/1974 | Klein | 43/44.9 |

Primary Examiner—Nichoias P. Godici

[57] ABSTRACT

Apparatus is disclosed for permitting variable adjustment of the float position for a bobber or other float device on a fishing line. The apparatus includes the combination of a friction coil attached to the line and movable thereon, and a bead having a hole diameter large enough for freely passing the line therethrough, but smaller than the size of the friction coil.

5 Claims, 3 Drawing Figures

FLOAT POSITION ADJUSTMENT APPARATUS FOR FISHING LINE

BACKGROUND OF THE INVENTION

This invention relates to an apparatus for permitting the flexible adjustment and readjustment of the relative position of a float along a fishing line. It is uniquely adaptable for fishing in that it permits the depth of fishing to be easily controlled without harm to the fishing line and according to a very simple adjustment procedure.

It is necessary when fishing in waters where a bobber is used to float on the surface of the water and thereby suspend the bait and hook at a predetermined depth below the surface, to have the means for changing the depth of the bait and hook depending upon conditions. It is well known that fishing conditions vary such that the depth of the bait and hook beneath the surface is a critical parameter in obtaining good results. For example, one may fish in shallow water and desire the bait to be suspended close to the bottom, and may therefore wish to adjust the floating bobber so as to provide the proper depth of suspension. Alternatively, one may fish in relatively deep water and desire that the bait be suspended at some intermediate depth because water temperature, currents, or other factors have shown the likelihood of catching fish at this depth is much greater than at any other depth.

In addition, it is desirable when fishing with or without a float to have the ability to cast the bait and hook into the water a distance away from the location of the fisherman. Many prior art float devices made such casting difficult, because they were fixed on the line and therefore required that the line could only be reeled in to the point where the float contacted the end of the pole, thereby leaving a length of line between the float and the bait and hook to be manipulated by the casting operation. This requires a very careful casting operation and frequently makes it difficult to achieve a long casting distance because of the unwieldy effect of the float and length of line between it and the fishhook.

Further, many prior art floats have utilized spring clamping mechanisms which are clipped to the fishing line and held in a fixed position by means of a frictional clamp. This spring clamping mechanism may damage the fishing line and thereby weaken it, increasing the chance of breaking the line during the fishing operation. If such a spring-clamping float is used frequently and is clamped at a number of different points along the line in order to achieve different fishing depth, it may create small indentations at each of the clamping points along the line and thereby form a number of potential weak spots along the fishing line.

It is therefore an advantage to provide a float adjustment apparatus which permits a ready and flexible adjustment for positioning the float at any point along the line. It is a further advantage to provide a float adjustment apparatus which does not harm the line in any way. It is yet another advantage of a float adjustment apparatus to provide a fixed float position while fishing, and at the same time permit the entire line to be reeled in for casting.

SUMMARY OF THE INVENTION

The present invention comprises a friction coil preferably made from the same or similar material as the fishing line itself, said friction coil comprising a length of such material which is frictionally held to the line by means of a coil which is formed as described in the preferred embodiment of the invention. Additionally, a bead or other slip device is threaded onto the line, and has a diameter greater than the line diameter but less than the coil size so as to permit free movement along the line until the friction coil is encountered.

BRIEF DESCRIPTION OF THE DRAWINGS

A preferred embodiment of the present invention is described herein with reference to the appended drawings, in which.

DESCRIPTION OF THE PREFERRED EMBODIMENT

Figure 1:
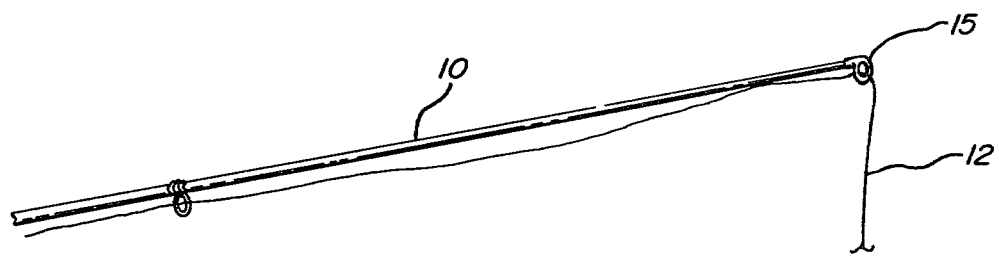
FIG. 1 illustrates the friction coil and slip mechanism of the invention.

Referring first to FIG. 1, there is shown an overall view of the invention as it might typically be used. A fishing pole 10 has a line 12 threaded through respective eyelets attached to the pole, including eyelet 15 on the end of the fishing pole. Typically, these eyelets are constructed in successively smaller diameters along the pole, with eyelet 15 being the smallest in diameter. Fishing line 12 is typically made from a nylon or nylon filament material of a diameter depending upon and consistent with the desired line strength.

Line 12 passes through a fishing float 30, which is constructed from cork, plastic or other buoyant material which will float on the surface of the water 18. Float 30 supports the portion of line 12 submerged beneath the surface and suspends therefrom fishhook 20 and whatever bait is being utilized. Float 30 has a hole passing through its diameter, which hole is large enough to permit the free sliding of line 12 therethrough.

A friction coil 11 is attached to line 12, according to the teachings to be hereinafter described, at a suitable distance from the hook 20. A bead 13 is threaded onto line 12 between hook 20 and friction coil 11. Bead 13 may be made from glass or plastic or any other suitable material, the requirement being that it have an internal diameter large enough for free sliding along line 12, but small enough so as to not fit over friction coil 11 and thereby to be prevented from slipping further along line 12 than the tie point of friction coil 11.

Figure 2:
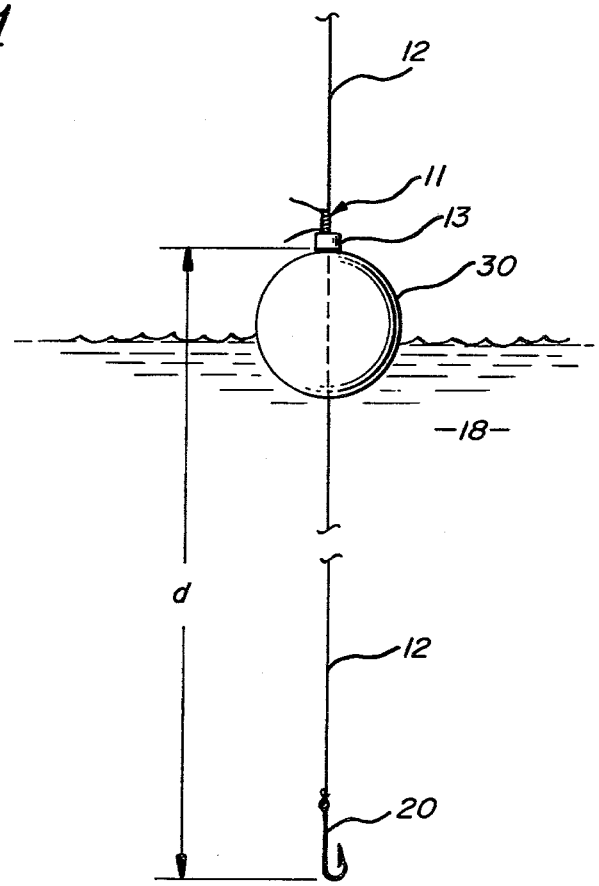
FIG. 2 illustrates a preferred form of the friction coil on the line.
Figure 2:
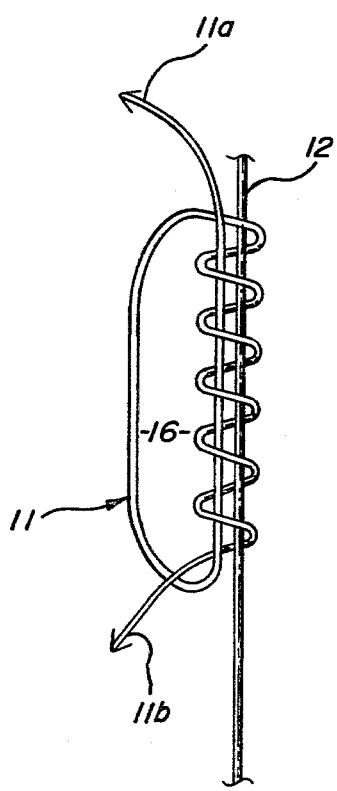
Figure 3:
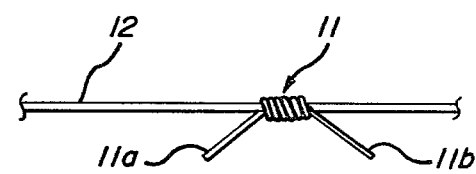
FIG. 3 illustrates a friction coil tightly attached to the line.

FIG. 2 illustrates in expanded view the preferred attachment of friction coil 11 onto line 12. Friction coil 11 comprises a short length of line, preferably of the same or similar material as line 12, which is formed into a coil comprising at least six loops about line 12, wherein one end 11A is looped back and fed through each of the line loops and the other end 11B is fed through the loop 16 created thereby. Line ends 11A and 11B are then pulled tight to tighten friction coil 11 against line 12 as shown in FIG. 3. Line ends 11A and 11B may be trimmed back to leave a nominal length of about 1½ inches extending from friction coil 11.

In operation, after the foregoing tieing procedure is accomplished, friction coil 11 is movable along line 12 to any desired position. Bead 13 is slipped over line 12 and float 30 is slipped over line 12 thereafter. Hook 20 is attached and the apparatus is ready for use. When line 12 is reeled into the fishing reel friction coil 11 will readily slide through eyelet 15 and other eyelets along fishing pole 10 to permit the complete reeling in of line 12 to the point where bead 13, float 30 and hook 20 are all reeled to eyelet 15.

In an alternative embodiment, the function served by bead 13 may be combined into the construction of float 30. This may be simply done if the diameter of the hole through float 30 is controlled to be large enough to freely slide along line 12, yet small enough to not pass over friction coil 11. In this alternative embodiment the apparatus may be completely practiced by means of a friction coil 11 and a suitably constructed float 30.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. An apparatus for adjustably positioning a float along a fishing line, comprising a friction coil having at least six loops about said line with one end of said coil looped back through said six loops and the other end of said coil fed through the loop created by the looping back of said one end; and means for sliding along said line and contacting said friction coil, comprising an object having a hole therethrough of diameter larger than the diameter of said line and smaller than said friction coil.

2. The apparatus of claim 1, wherein said friction coil is constructed of the same material as said fishing line.

3. The apparatus of claim 2, wherein said friction coil is attached about said line with sufficient clamping force to prevent free sliding thereon but insufficient clamping force to prevent frictional sliding thereon.

4. The apparatus of claim 1, wherein said means for sliding along said line further comprises a bead having a hole therethrough.

5. The apparatus of claim 1, wherein said means for sliding along said line further comprises a float having a hole therethrough.

* * * * *